Patented Apr. 16, 1940

2,197,095

UNITED STATES PATENT OFFICE 2,197,095

TREATMENT OF MILK OR MILK PRODUCTS FOR THE PERMANENT DISTRIBUTION THEREIN OF VITAMINS

Bernard Cuenod, Lausanne, Switzerland, assignor to the firm Societe d'etudes et applications industrielles, Lausanne, Switzerland No Drawing. Application November 9, 1935, Serial No. 49,113. In Switzerland November 14, 1934

2 Claims. (Cl. 99—11)

This invention has reference to the treatment of concentrated, sweetened milk, block milk, milk paste, milk powder and derived milk products by the combination therewith of vitamins, and has for its object to provide a new or improved process for effecting the permanent distribution or amalgamation therein or therewith of vitamins, which consists essentially in the employment of concentrated sweetened milk as a carrier and emulsifying agent for the vitamins whereby the most important vitamins are simultaneously contained in the milk in a stable form and in the most suitable quantity and degree of concentration.

The object of the invention is not capable of achievement by simply mixing the desired vitamins in the appropriate quantities with fresh or unsweetened milk. Fish oils, e. g. codliver oil, which contain fat soluble vitamins A and D in a particularly favourable ratio, can only be evenly and permanently mixed with fresh or unsweetened condensed milk under high pressure. Furthermore, water soluble vitamin C is so susceptible to oxidation and decomposition when subjected to heat, that it is incapable of mixture with fluid milk or unsweetened condensed milk, which must then be sterilized without affecting the vitamins so that it may be preserved. By the homogenisation of fresh milk or unsweetened condensed milk, a treatment indispensable to prevent subsequent fat separation owing to the considerable increase of the surface of the comminuted globules of fat, the vitamin A would be more exposed to oxidation and decomposition. It must also be borne in mind that the keeping properties of vitamin C in solution depend greatly upon the concentration of the vitamin therein. Particularly high degrees of concentration cannot be obtained in fresh or unsweetened condensed milk without risk of altering the characteristic properties thereof. Then again, the fat soluble vitamin A is also very sensitive to high temperatures particularly when oxidising agents are present. Therefore, milk which contains this or other heat sensitive vitamins should not be sterilized at high temperatures.

By means of the present invention the above mentioned disadvantages are overcome or minimized.

According to the invention, the vitamin or vitamins in the form of an emulsion with sweetened condensed milk may be added during various stages in the manufacture of sweetened condensed milk, block milk, milk powder and derived milk products. Fat soluble vitamins are added in the form of an emulsion with sweetened condensed milk to concentrated sweetened milk which it is desired to enrich in vitamins during the process of manufacturing the same either before or after pasteurisation of the fresh milk, while the water soluble vitamins are only added during the process of concentration. The concentrated and sweetened milk containing vitamins can finally be transformed into a dry product or concentrated to form a paste which can be pressed into blocks whereby the degree of concentration of the vitamins is increased. Concentrated sweetened milk is eminently adapted for use as a carrier for the vitamins emulsified therein and is capable of maintaining in suspension in a permanent form the large quantities of fatty substances containing natural vitamins, as, for instance fish oils, which must be introduced into the milk to ensure an effective quantity of vitamins therein.

It may be observed that most excellent results have been obtained by the emulsification of, for instance, cod liver oil with concentrated sweetened milk, the emulsion being absolutely permanent in that the added fish oil rich in vitamins does not separate out and no deposit forms. Furthermore, it is found that comparatively large quantities of fish oil can be emulsified in concentrated sweetened milk without risk of the emulsion being upset if subjected to dilution.

As stated above, fish oil can be easily and intimately distributed in concentrated sweetened milk. The reaction which takes place between the fat and the milk components leads to a stable dispersion of the fish oil. This reaction is based on the fact that the chemically highly unsaturated fat combines with the proteins of the milk. Further, because of the high proportion of sugar added during manufacture, the proteins partly lose their affinity for water and consequently combine more easily with the fat. This increased affinity is even a condition for a stable behaviour of the distributed fat in the concentrated sweetened milk.

The fact that vitamin C, which is a fairly strong acid, reacts with the proteins and the salts of the milk ensures its homogeneous distribution. The weak acid reaction of the condensed milk, likewise the low water concentration, favours the preservation of the vitamin C. Moreover, due to the strong buffer action of the milk proteins and salts, the addition of vitamin C hardly alters the pH of the milk.

Since the concentrated sweet milk, to render it stable, need not be sterilized, it is an excellent carrier for the vitamins because it is not subjected, during manufacture, to any treatment which injuriously affects vitamins susceptible to oxidation and heat. It is therefore possible to regulate with considerable accuracy the contents of vitamins A and C as well as B and D in the milk.

According to one mode of carrying the invention into effect, a given quantity of fish oil, for example, cod liver oil, halibut liver oil or concentrates or extracts thereof in an odourless condition, if required, is emulsified by subjecting it to energetic stirring with a small quantity of concentrated sweetened milk which is free from oxidising influences. This first emulsion is intimately mixed with fresh milk either before or after the pasteurisation of the latter and thereupon subjected to a concentration process with the result that, owing to the boiling of the liquid incidental to such process, complete distribution of the concentrate in the added liquid is effected. During the concentration, the vitamin C in the required quantity can be added in the form of ascorbic acid or in the form of vitamin containing fruit juices or extracts thereof such as lemon and the like. Also, in a similar manner, an extract containing vitamin B may be added. According to the nature of the acid content of the concentrate of vitamins C, the addition thereof must be conducted slowly and in small quantities, so that at no time is the concentration of the acid at any point of the mass of milk sufficient to cause coagulation of the latter.

Obviously the fat-soluble and water-soluble vitamins may be emulsified directly in concentrated sweetened milk if the necessary precautionary measures are taken against the incorporation in the milk of air or other oxidising agent.

The sugar content of the final product imparts particularly a good keeping quality thereto and obviates the necessity for concentrating the milk under temperatures which would be injurious to heat sensitive vitamins. Moreover it is found that the low water content of the concentrated sweetened milk is conducive to the keeping quality of vitamin C.

The dispersion of vitamins or vitamin carriers in concentrated sweetened milk in the manner herein described is very stable and the product can be diluted as may be desired.

Having now particularly described and ascertained the nature of my said invention and in what manner the same is to be performed, I declare that what I claim is:

1. A process of manufacturing concentrated sweetened milk containing added vitamins comprising adding fat soluble vitamin concentrates in the form of an emulsion to the milk to be concentrated, concentrating the mixture of enriched milk and required quantity of sugar, adding water soluble vitamins at a stage nearing the end of the concentrating step, and further concentrating the mixture up to the total solids content usual for concentrated sweetened milk.

2. A process of manufacturing concentrated sweetened milk containing added vitamins comprising adding fat soluble vitamin concentrates in the form of an emulsion with concentrated sweetened milk to the milk to be concentrated, concentrating the mixture of enriched milk and required quantity of sugar, adding water soluble vitamins at a stage nearing the end of the concentrating step, and further concentrating the mixture up to the total solids content usual for concentrated sweetened milk.

BERNARD CUENOD.